(12) United States Patent
Kim

(10) Patent No.: US 10,056,629 B2
(45) Date of Patent: Aug. 21, 2018

(54) METHOD FOR ADJUSTING OUTPUT OF FUEL CELL SYSTEM

(71) Applicant: Hyundai Motor Company, Seoul (KR)

(72) Inventor: Hyo Seop Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 279 days.

(21) Appl. No.: 15/182,647

(22) Filed: Jun. 15, 2016

(65) Prior Publication Data

US 2017/0162885 A1 Jun. 8, 2017

(30) Foreign Application Priority Data

Dec. 4, 2015 (KR) ........................ 10-2015-0172685

(51) Int. Cl.
| | |
|---|---|
| *H01M 4/04* | (2006.01) |
| *H01M 8/04828* | (2016.01) |
| *H01M 8/2457* | (2016.01) |
| *B60L 11/18* | (2006.01) |
| *H01M 8/0438* | (2016.01) |
| *H01M 8/241* | (2016.01) |
| *H01M 8/04858* | (2016.01) |

(52) U.S. Cl.
CPC ....... *H01M 8/0485* (2013.01); *B60L 11/1881* (2013.01); *H01M 8/0491* (2013.01); *H01M 8/04395* (2013.01); *H01M 8/241* (2013.01); *H01M 8/2457* (2016.02); *H01M 2250/20* (2013.01); *Y02T 90/32* (2013.01)

(58) Field of Classification Search
CPC ......... H01M 8/04335; H01M 8/04395; H01M 8/04619; H01M 8/0485; H01M 8/0491; H01M 8/0494

USPC ........................................................ 429/450
See application file for complete search history.

(56) References Cited

U.S. PATENT DOCUMENTS

| | | | | |
|---|---|---|---|---|
| 4,202,933 A | * | 5/1980 | Reiser ............... | H01M 8/04007 |
| | | | | 429/432 |
| 2014/0081497 A1 | | 3/2014 | Jeon et al. | |
| 2015/0004508 A1 | * | 1/2015 | Sato .................. | H01M 8/04089 |
| | | | | 429/432 |

FOREIGN PATENT DOCUMENTS

| | | |
|---|---|---|
| JP | 2007-141566 A | 6/2007 |
| KR | 2012-0060284 A | 6/2012 |
| KR | 2014-0037724 A | 3/2014 |
| KR | 2015-0071098 A | 6/2015 |
| KR | 2015-0071739 A | 6/2015 |

\* cited by examiner

*Primary Examiner* — Basia Anna Ridley
*Assistant Examiner* — James M Erwin
(74) *Attorney, Agent, or Firm* — Mintz Levin Cohn Ferris Glovsky and Popeo, P.C.; Peter F. Corless

(57) ABSTRACT

A method for adjusting an output of a fuel cell system is capable of estimating a dry state of a fuel cell vehicle by comparing air flow rates, and adjusting a maximum output applicable to the fuel cell vehicle, thus enabling the fuel cell vehicle to be stably driven. The method for adjusting the output of the fuel cell system includes comparing an air flow rate required for driving and an actually introduced air flow rate to calculate an average air flow rate, and calculating an available output of the vehicle using preset mapping data with respect to the average air flow rate.

11 Claims, 3 Drawing Sheets

METHOD FOR ADJUSTING OUTPUT OF FUEL CELL SYSTEM

CROSS-REFERENCE TO RELATED APPLICATION

This application claims under 35 U.S.C. § 119(a) the benefit of Korean Patent Application No. 10-2015-0172685, filed on Dec. 4, 2015 in the Korean Intellectual Property Office, the entire contents of which are incorporated by reference herein.

BACKGROUND (a) Technical Field

The present invention relates to a method for adjusting an output of a fuel cell system, and more particularly, to a method for adjusting an output of a fuel cell system by comparing an air flow rate required for driving and an actually introduced air flow rate to produce an average air flow rate.

(b) Description of the Related Art

In a fuel cell vehicle equipped with a fuel cell system, electricity is produced by supplying hydrogen used as fuel to a fuel cell stack, and the vehicle is driven by operating an electric motor with electricity produced by the fuel cell stack.

The fuel cell system is a type of power generation system directly electrochemically converting chemical energy of fuel into electric energy within the fuel cell stack, rather than converting the chemical energy of fuel into heat through combustion.

In the fuel cell system, hydrogen of high impurity is supplied from a hydrogen storage tank to an anode of a fuel cell during operation, and air in the atmosphere is directly supplied to a cathode of the fuel cell using an air supply device such as an air blower.

Thus, hydrogen supplied to the fuel cell stack is separated into a hydrogen ion and an electron in a catalyst of the anode, and the separated hydrogen ion crosses to the cathode through a polymer electrolyte membrane, and oxygen supplied to the cathode is combined with an electron introduced to the cathode through an external conducting wire to produce water to generate electric energy.

That is, the fuel cell system has a control function of receiving air and hydrogen while managing heat, a control function of distributing power between a high voltage battery and the fuel cell system, and a control function of driving a vehicle according to a driver's intention.

However, in a process of producing electricity by supplying hydrogen to the fuel cell stack of such a fuel cell system, moisture produced within the fuel cell stack significantly affects performance of the fuel cell vehicle.

SUMMARY

An aspect of the present invention provides a method for adjusting an output of a fuel cell system, capable of estimating a dry state of a fuel cell vehicle by comparing an air flow rate required for driving and an actually introduced air flow rate to produce an average air flow rate, and adjusting a maximum output applicable to the fuel cell vehicle, thus enabling the fuel cell vehicle to be stably driven.

Foregoing technical subjects and any other technical subjects according to an exemplary embodiment of the present invention will be understood from the following descriptions and become apparent by exemplary embodiments of the present invention. Also, it may be easily understood that the advantages, features and aspects of the present invention may be realized by means and combinations demonstrated in claims.

According to an exemplary embodiment of the present invention, a method for adjusting an output of a fuel cell system includes: comparing an average air flow rate required for driving a vehicle and an actually introduced average air flow rate and calculating an average air flow rate; and comparing the average air flow rate with a preset air flow rate and adjusting an available output of the vehicle.

Adjustment of the available output of the vehicle may include: comparing the calculated average air flow rate with a first air flow rate; when the average air flow rate is greater than the first air flow rate, comparing the average air flow rate with a value between the first air flow rate and a second air flow rate; when the average air flow rate is not a value between the first air flow rate and the second air flow rate, comparing the average air flow rate with a value between the second air flow rate and a third air flow rate; and when the average air flow rate is not a value between the second air flow rate and the third air flow rate, determining whether the average air flow rate is a value greater than the third air flow rate.

The method may further include: when the average air flow rate is a value smaller than the first air flow rate, continuously monitoring the average air flow rate.

In the comparing of the average air flow rate with a value between the first air flow rate and the second air flow rate, when the average air flow rate is a value between the first air flow rate and the second air flow rate, an output available current may be limited to 80% of a normal output of the fuel cell system.

In the comparing of the average air flow rate with a value between the second air flow rate and the third air flow rate, when the average air flow rate is a value between the second air flow rate and the third air flow rate, an output available current may be limited to 60% of the normal output of the fuel cell system.

In the determining whether the average air flow rate is greater than the third air flow rate, when the average air flow rate is a value greater than the third air flow rate, an output available current may be limited to 40% of the normal output of the fuel cell system.

The first air flow rate may be an air flow rate above 80% of the normal output of the fuel cell system.

The second air flow rate may be an air flow rate within a range from 60% to 80% of the normal output of the fuel cell system.

The third air flow rate may be an air flow rate within a range from 40% to 60% of the normal output of the fuel cell system.

The method may further include, after the adjusting of the available output of the vehicle, performing controlling, by the fuel cell system, to recover a wet state or a dry state.

A non-transitory computer readable medium containing program instructions executed by a processor can include: program instructions that compare an air flow rate required for driving a vehicle and an actually introduced air flow rate and calculate an average air flow rate; and program instructions that compare the average air flow rate with a preset air flow rate and adjust an available output of the vehicle.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
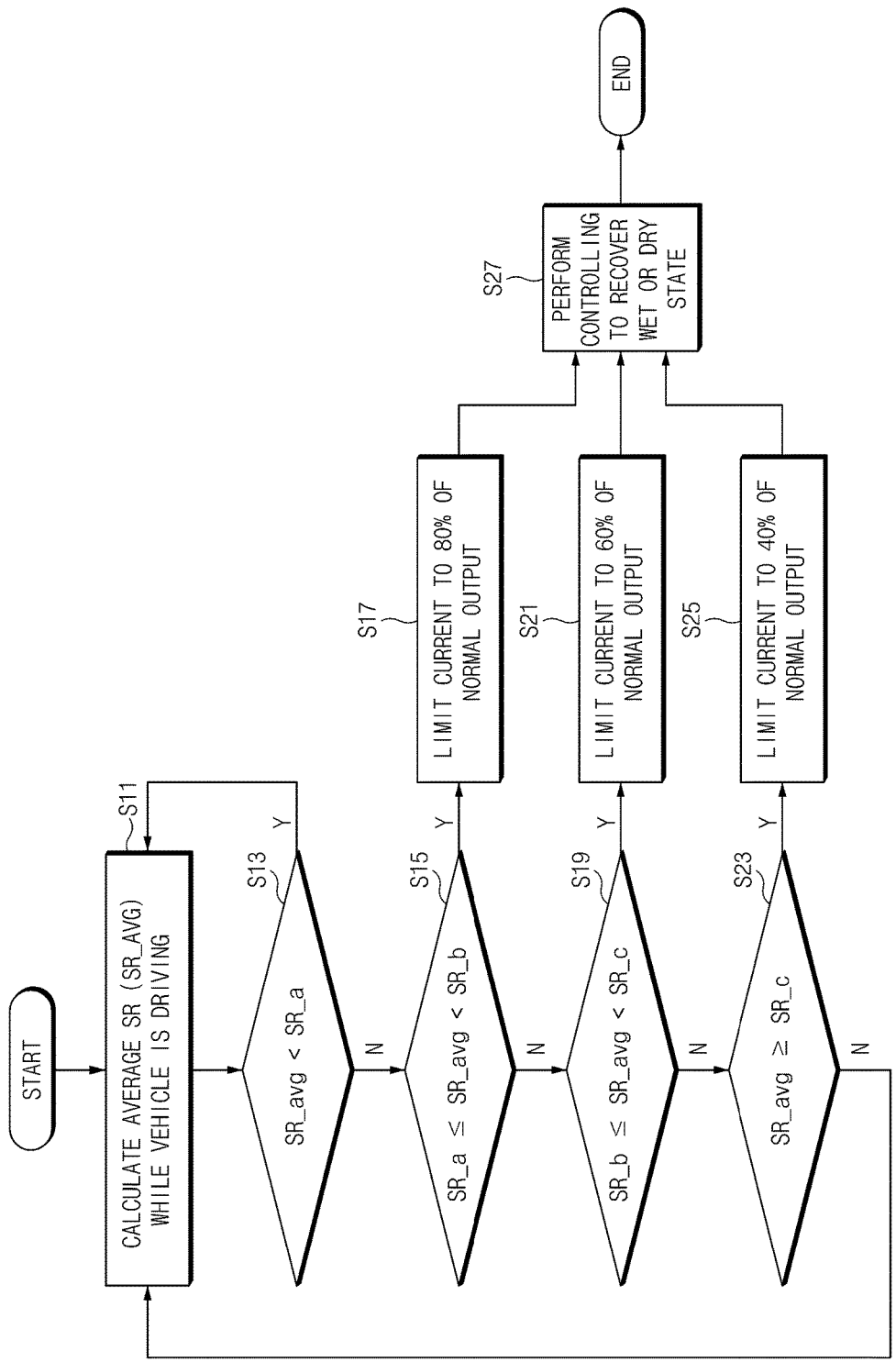
FIG. 1 is a flow chart illustrating a method for adjusting an output of a fuel cell system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Advantages and features of the present invention, and implementation methods thereof will be described through exemplary embodiments described with reference to the accompanying drawings. The present invention may, however, be embodied in different forms and should not be construed as limited to the embodiments set forth herein. Rather, these embodiments are provided to describe the present invention so that a technical concept of the present invention may be easily practiced by those skilled in the art to which the present invention pertains.

Hereinafter, exemplary embodiment of the present invention will be described in detail with reference to the accompanying drawings.

FIG. 1 is a flow chart illustrating a method for adjusting an output of a fuel cell system according to an exemplary embodiment of the present invention.

Referring to FIG. 1, first, a fuel cell system determines an air flow rate required for a reference period of time while a fuel cell vehicle is driving.

Next, the fuel cell system determines an air flow rate actually introduced during the reference period of time while the vehicle is driving.

The steps of determining the average flow rate required for the reference period of time and the actual air flow rate introduced during the reference prior of time (i.e., while the vehicle is driving) are performed by a controller of the fuel cell system.

Here, the air flow rate refers to a stoichiometry ratio (SR) and indicates an air flow rate supplied to a cathode of the fuel cell stack (hereinafter, referral to as a "stack").

Also, in FIG. 1, a first air flow rate may be denoted by SR_a, a second air flow rate may be denoted by SR_b, and a third air flow rate may be denoted by SR_c.

Thereafter, the fuel cell system calculates an average air flow rate (SR_avg) by comparing the actually introduced air flow rate with the air flow rate required for the reference period of time in operation S11. This step is performed by the controller of the fuel cell system.

Thereafter, the fuel cell system compares the calculated average air flow rate with the first air flow rate in operation S13.

That is, the fuel cell system may compare the calculated average air flow rate (SR_avg) with the set air flow rates (from the first air flow rate to the third air flow rate) by using mapping data or a current limitation map, and limit an output available current.

Here, the first air flow rate includes an air flow rate of 80% or higher of a normal output of the fuel cell system.

When the average air flow rate is smaller than the first air flow rate, the fuel cell system returns to operation S11 so that an average air flow rate may be continuously monitored.

When the average air flow rate compared with the first air flow rate is greater than the first air flow rate, the fuel cell system compares the average air flow rate with a value between the first air flow rate and the second air flow rate in operation S15.

Here, the second air flow rate includes an air flow rate within a range from 60% to 80% of the normal output of the fuel cell system.

When the average air flow rate compared with a value between the first air flow rate and the second air flow rate is a value between the first air flow rate and the second air flow rate, the fuel cell system limits an output available current to 80% of the normal output (current) in operation S17.

However, when the average air flow rate is not a value between the first air flow rate and the second air flow rate, the fuel cell system compares the average air flow rate with a value between the second air flow rate and the third air flow rate in operation S19.

Here, the third air flow rate includes an air flow rate within a range from 40% to 60% of the normal output of the fuel cell system.

When the average air flow rate compared with a value between the second air flow rate and the third air flow rate is a value between the second air flow rate and the third air flow rate, the fuel cell system limits an output available current to 60% of the normal output (current) of the fuel cell system in operation S21.

However, when the average air flow rate is not a value between the second air flow rate and the third air flow rate, the fuel cell system compares the average air flow rate with the third air flow rate to determine whether the average air flow rate is greater than the third air flow rate in operation S23.

When the average air flow rate compared with the third air flow rate is greater than the third air flow rate, the fuel cell system limits an output available current to 40% of the normal output (current) of the fuel cell system in operation S25.

After performing operations S17, S21 and S25, the fuel cell system performs controlling to recover a wet state and a dry state in operation S27. In particular, the above comparisons and control steps are performed by the controller of the fuel cell system.

Figure 2:
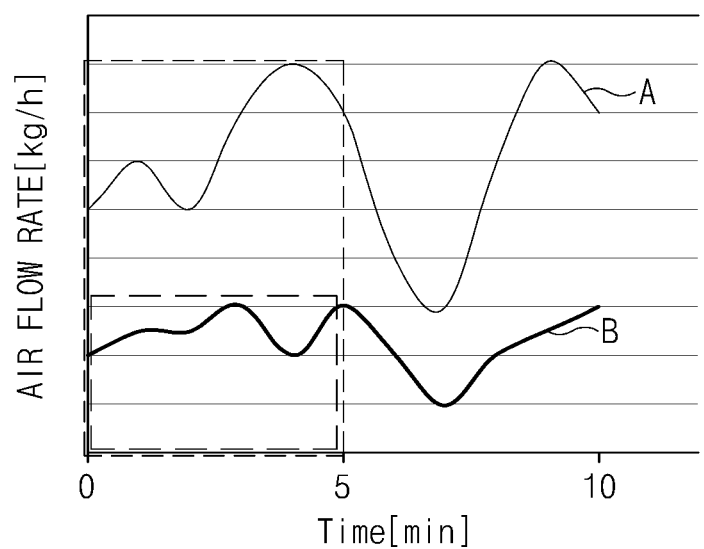
FIG. 2 is a graph illustrating an actual air flow rate while a fuel cell vehicle according to an exemplary embodiment of the present invention is actually driven and a required air flow rate.

FIG. 2 is a graph illustrating an actual air flow rate while a fuel cell vehicle according to an exemplary embodiment of the present invention is actually driving and a required air flow rate.

Referring to FIG. 2, a fuel cell vehicle including a fuel cell system adds up air flow rates A introduced to a cathode of a fuel cell stack during actual driving and air flow rates B required during actual driving for five minutes, respectively, and calculates the actually introduced air flow rate A and the required air flow rate B to calculate an average air flow rate SR_avg.

Here, the fuel cell system compares the average air flow rate with 80% or greater of a normal output of a vehicle, and when the average air flow rate is smaller, the fuel cell system may continuously monitor the average air flow rate and re-circulate it.

Figure 3:
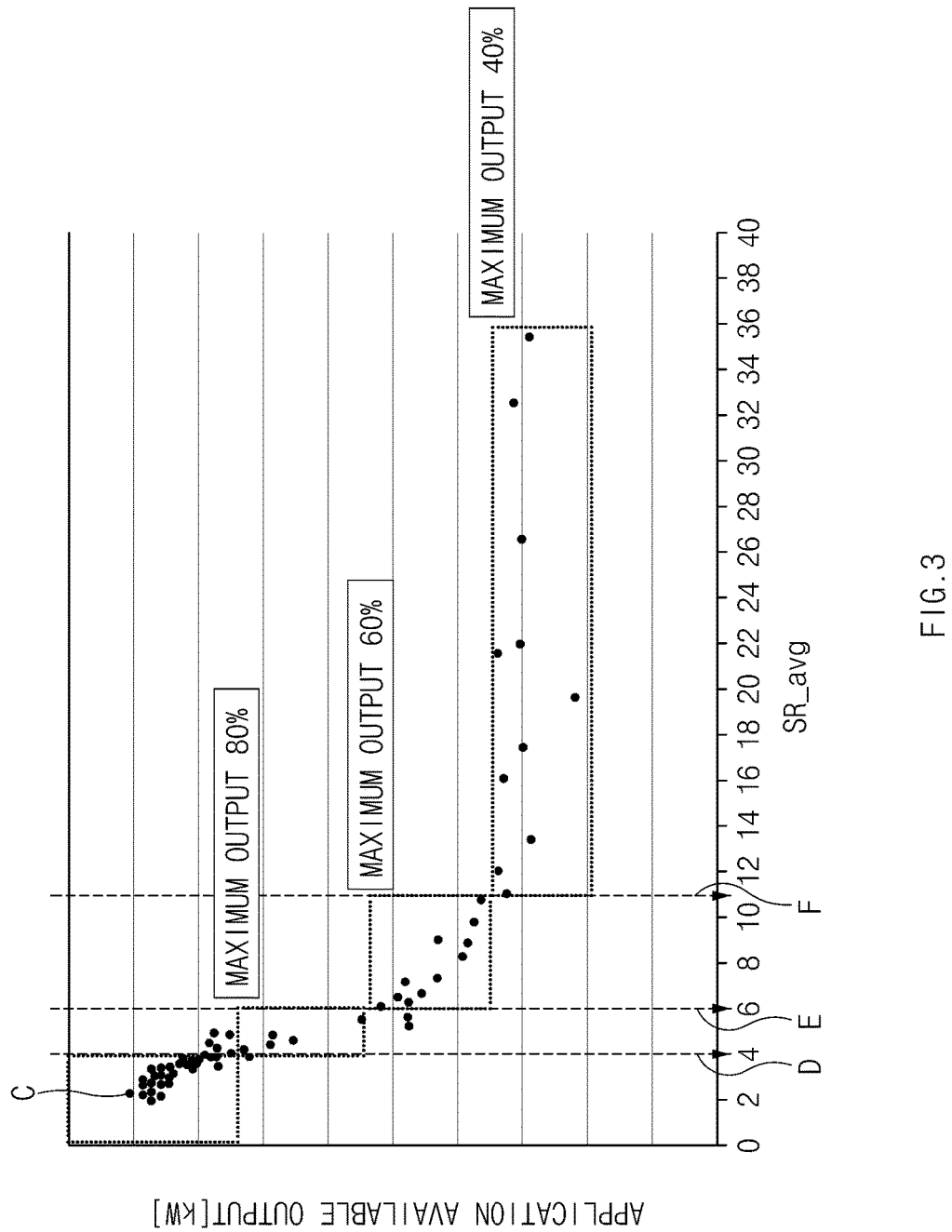
FIG. 3 is a graph illustrating data obtained by mapping average values of air flow rates of a fuel cell vehicle according to an exemplary embodiment of the present invention.

FIG. 3 is a graph illustrating data obtained by mapping average values of air flow rates of a fuel cell vehicle according to an exemplary embodiment of the present invention.

Referring to FIG. 3, after calculating an average air flow rate C, the fuel cell system selectively adjusts a maximum output value that may be applied to the fuel cell vehicle.

That is, it can be seen that the average air flow rate C of the fuel cell vehicle is linearly changed downwards as illustrated in FIG. 3, while the vehicle is driving in preparation of an output (current).

Also, the fuel cell system may perform control such that an output equal to or greater than 80% of the normal output of the fuel cell system may be provided at a first air flow rate D, perform control such that an output within a range from 60% to 80% of the normal output of the fuel cell system may be provided at a second air flow rate E, and perform control such that an output within a range from 40% to 60% of the normal output of the fuel cell system may be provided at a third air flow rate F.

As described above, according to an exemplary embodiment of the present invention, an output of the fuel cell vehicle is adjusted by predicting a dry state of the fuel cell stack while the fuel cell vehicle is driving, whereby the fuel cell vehicle is prevented from entering an area in which an output is instantly impossible and safe driving is ensured.

In addition, according to an exemplary embodiment of the present invention, a driver may feel the fuel cell vehicle lean less to one side in a region in which an output of the vehicle is impossible, thus promoting enhancement of driving characteristics of the vehicle.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A method for adjusting an output of a fuel cell system, the method comprising:
   comparing an average air flow rate required for driving a vehicle and an actually introduced average air flow rate and calculating an average air flow rate; and
   comparing the average air flow rate with a preset air flow rate and adjusting an available output of the vehicle.

2. The method according to claim 1, wherein the comparing of the average air flow rate with the preset average air flow rate includes:
   comparing the calculated average air flow rate with a first air flow rate;
   when the average air flow rate is greater than the first air flow rate, comparing the average air flow rate with a value between the first air flow rate and a second air flow rate;
   when the average air flow rate is not a value between the first air flow rate and the second air flow rate, comparing the average air flow rate with a value between the second air flow rate and a third air flow rate; and
   when the average air flow rate is not a value between the second air flow rate and the third air flow rate, determining whether the average air flow rate is a value greater than the third air flow rate.

3. The method according to claim 2, further comprising:
   when the average air flow rate is a value smaller than the first air flow rate, continuously monitoring the average air flow rate.

4. The method according to claim 2, wherein, in the comparing of the average air flow rate with a value between the first air flow rate and the second air flow rate, when the average air flow rate is a value between the first air flow rate and the second air flow rate, an output available current is limited to 80% of a normal output of the fuel cell system.

5. The method according to claim 2, wherein, in the comparing of the average air flow rate with a value between the second air flow rate and the third air flow rate, when the average air flow rate is a value between the second air flow rate and the third air flow rate, an output available current is limited to 60% of a normal output of the fuel cell system.

6. The method according to claim 2, wherein, in the determining whether the average air flow rate is greater than the third air flow rate, when the average air flow rate is a value greater than the third air flow rate, an output available current is limited to 40% of the normal output of the fuel cell system.

7. The method according to claim 2, wherein the first air flow rate is an air flow rate above 80% of the normal output of the fuel cell system.

8. The method according to claim 2, wherein the second air flow rate is an air flow rate within a range from 60% to 80% of the normal output of the fuel cell system.

9. The method according to claim 2, wherein the third air flow rate is an air flow rate within a range from 40% to 60% of the normal output of the fuel cell system.

10. The method according to claim 1, further comprising, after the adjusting of the available output of the vehicle, performing controlling, by the fuel cell system, to recover a wet state or a dry state.

11. A non-transitory computer readable medium containing program instructions executed by a processor, the computer readable medium comprising:
program instructions that compare an average air flow rate required for driving a vehicle and an actually introduced average air flow rate and calculate an average air flow rate; and
program instructions that compare the average air flow rate with a preset air flow rate and adjust an available output of the vehicle.

* * * * *